United States Patent [19]
Neill

[11] Patent Number: 6,029,201
[45] Date of Patent: Feb. 22, 2000

[54] INTERNET APPLICATION ACCESS SERVER APPARATUS AND METHOD

[75] Inventor: Robert Neill, Abbotsford, Canada

[73] Assignee: International Business Machines Corporation, Armonk, N.Y.

[21] Appl. No.: 08/905,197

[22] Filed: Aug. 1, 1997

[51] Int. Cl.$^7$ .............................. G06F 17/00; G06F 13/00; G06F 15/16; G06F 13/38

[52] U.S. Cl. ......................... 709/228; 709/227; 709/218; 709/219; 709/203

[58] Field of Search ........................ 395/200.33, 200.48, 395/200.49, 200.57, 200.58; 709/228, 227, 203, 218, 219

[56] References Cited

U.S. PATENT DOCUMENTS

| | | | |
|---|---|---|---|
| 5,303,375 | 4/1994 | Collins et al. | 709/100 |
| 5,497,463 | 3/1996 | Stein et al. | 709/203 |
| 5,537,417 | 7/1996 | Sharma et al. | 709/228 |
| 5,548,726 | 8/1996 | Pettus | 709/221 |
| 5,721,876 | 2/1998 | Yu et al. | 709/249 |
| 5,828,855 | 10/1998 | Walker | 709/227 |
| 5,889,962 | 3/1999 | Hanif et al. | 709/228 |

OTHER PUBLICATIONS

W. Richard Stevens, UNIX network programming, Prentice Hall, pp. 194–195, 208–213, 264–269, 334–339, 534–537, 1990.

W. Richard Stevens, UNIX Network Programming, PTR Prentice Hall, 1990.

*Primary Examiner*—Zarni Maung
*Assistant Examiner*—Quoc-Khanh Le
*Attorney, Agent, or Firm*—A. P. Tennent

[57] ABSTRACT

The invention provides a communication system for accessing system services on a network of information handling devices including a server running on a host computer adapted to listen at a predefined port for requests for connection to service access agents; where the requests come from a client application; wherein the server is adapted to determine how to start the access agent for service as specified in the request; wherein the server is adapted to start the access agent with a dynamically assigned socket; and, wherein the client is notified by acknowledgment of the request, the acknowledgment including identification of the assigned socket to communicate with the requested access agent; the dynamically assigned socket being selected by system services from sockets available on the host computer on which the server is running; the access agent being adapted to access a requested service.

17 Claims, 8 Drawing Sheets

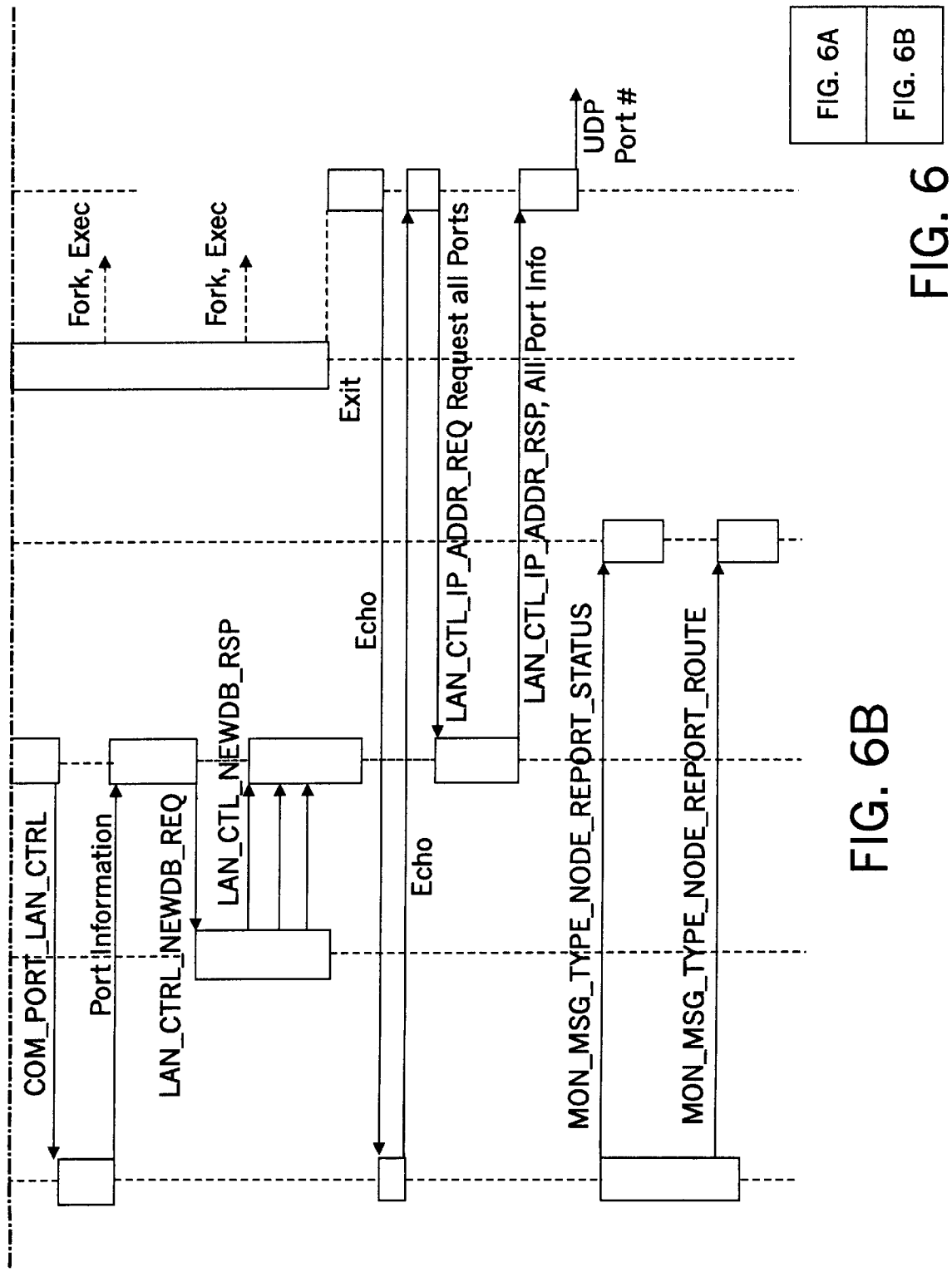

INTERNET APPLICATION ACCESS SERVER APPARATUS AND METHOD

CROSS REFERENCES TO RELATED PATENTS

The following patents are related to the present invention and incorporated herein by reference:

1. MULTIPLEXER FOR MULTIPLE MEDIA STREAMS, (IBM Attorney Docket CA997025A), Ser. No. 08/904,813, filed concurrently; pending
2. METHOD AND APPARATUS FOR CONTROLLING ELEMENTARY STREAM DATA FLOW, (IBM Attorney Docket CA997025A), Ser. No. 08/904,773, filed concurrently; pending
3. FRAME BUFFER FOR MULTIMEDIA TERMINAL, (IBM Attorney Docket CA997026), Ser. No. 08/904,819, filed concurrently; pending
4. ISOLATION OF MULTIMEDIA SIGNALS FOR TRANSMISSION AND PROCESSING WITHIN A MULTIMEDIA TERMINAL, (IBM Attorney Docket CA997027), Ser. No. 08/904,778, filed concurrently; pending
5. NETWORK COMMUNICATION SERVICES METHOD AND APPARATUS, (IBM Attorney Docket CA997034), Ser. No. 08/904,939, filed concurrently; pending
6. METHOD AND APPARATUS FOR MAINTAINING DIRECTORY SERVICES FOR A VIDEO TRANSMISSION NETWORK, (IBM Attorney Docket CA997035), Ser. No. 08/904,774, filed concurrently; pending
7. METHOD AND APPARATUS FOR CONTROLLING ACCESS IN A VIDEO DISTRIBUTION NETWORK, (IBM Attorney Docket CA997036), Ser. No. 08/904,776, filed concurrently; pending
8. METHOD AND APPARATUS FOR CONTROLLING NETWORK SWITCHES, (IBM Attorney Docket CA997037), Ser. No. 08/904,775, filed concurrently; pending and
9. METHOD AND APPARATUS FOR CONTROLLING A MIXED NETWORK OF ANALOG AND DIGITAL SWITCHES, (IBM Attorney Docket CA997038), Ser. No. 08/904,872, filed concurrently.

FIELD OF THE INVENTION

This invention relates to methods and apparatus to provide access to applications communication facilities on data processing machines that support Internet and similar protocols of communication.

BACKGROUND OF THE INVENTION

On a computer that supports the Internet Protocols, two of the more prominent service means to obtain access to services are INETD and Remote Procedure Call (RPC).

INETD

INETD provides an Internet service access system for many computer systems in order to provide access to a variety of services and protocols. These services can include:

TABLE 1:

Sample Internet Services

| Service | Port/Protocol |
|---|---|
| echo | 7/tcp |
| echo | 7/udp |
| discard | 9/tcp |
| discard | 9/udp |
| systat | 11/tcp |
| daytime | 13/tcp |
| time | 37/udp |
| rlp | 39/udp |
| nameserver | 42/udp | and many others. On a particular computer system used to prepare this document the combined count of Internet and Unix services is 72.

These services are typically available on or from all computers with the Internet protocols. The assignment of Internet service port numbers is centrally administrated by the Internet Assigned Numbers Authority (IANA) (the assignments are made in the Assigned Number RFC, the most recent being RFC1700), and the number of available ports, 65536 (64K) is small in proportion to both the number of computers using the Internet protocols, and to the number of potential applications that could use or provide Internet protocol access.

RPC Service

Many computers use a Sun Microsystems NFS file system service. A Remote Procedure Call (RPC) service is required to implement the NFS service. The RPC service provides a standardized method for client programs to address service requests to server programs or procedures on local and remote machines. These service procedures may include:

TABLE 2

Sample Sun Remote Procedure Call Service

| Program | Version | Protocol | Port | Alias |
|---|---|---|---|---|
| 100000 | 2 | udp | 111 | portmapper |
| 100004 | 1 | tcp | 666 | ypserv |
| 100028 | 1 | tcp | 671 | ypundated |
| 100005 | 2 | tcp | 720 | mountd |
| 100020 | 1 | tcp | 795 | llockmgr | and many more. There were 75 RPC services available on the computer that provided this sample.

Some of the RPC services are available on computers equipped with the Sun NFS service. Others are provided as a part of some software vendors products.

Sun Microsystems defines the administration of RPC program numbers. The numbers are assigned in eight groups of 0x2000 0000 (about 540 million). The first group is defined by Sun Microsystems; the second group is defined by the user (usually a software developer), and the third group is defined by applications that dynamically generate program numbers. The rest of the groups are apparently reserved for future use.

Limitations of the Prior Art

Both INETD and RPC services are oriented towards generic or general services and consequently have a wide range of applicability, e.g. ftp, ypbind, but they do not directly support the provision of multiple instances of services. In the case of situations involving the accessing of a large number of small specialized services, with multiple instances of those services the prior art services are less than suitable.

The services accessible by INETD are started when needed and die when the client application is finished with the services. The INETD service cannot connect a client to a service that is already running.

The RPC service always operates in a client/server mode, and the TCP/IP protocol requires a client/server relationship when communications is established.

A client/server relationship paradigm between computer applications that have peer to peer communications requirements, introduces an intermediary application that is unsatisfactory, due to increased system complexity. Also, when a client/server relationship is to be used between applications an implied order of application startup is created. This is not acceptable for a system with 7×24 (i.e. seven day 24 hours per day) availability requirements. If a server application near the top of the client/server hierarchy must be restarted, all subordinate applications in the hierarchy would have to be restarted or notified to reestablish their connections to nodes above them. Also, the server application would have no way to send unsolicited status messages to the client; the client would have to poll the server for status. For the use of a particular connection services as the application "node" (collection of applications) access server in a broadband video conferencing system with a distributed control architecture, the above-mentioned limitations are not acceptable.

SUMMARY OF THE INVENTION

The invention seeks to overcome these limitations of the prior art by providing method and apparatus to connect a client to a service that is: i) already running, or ii) to start up a service at the request of the client and connect to it, and iii) to permit either side of a connection path to initiate a connection. No specific order of startup or restart is required under the invention disclosed.

One aspect of the invention provides a communication system and a method and programming for establishing a communication system for accessing system services on a network of information handling devices that includes a server running on a host computer adapted to listen at a predefined port for requests for connection to service access agents; where the requests come from a client application; wherein the server is adapted to determine how to start the access agent for service as specified in the request; wherein the server is adapted to start the access agent with a dynamically assigned socket. The client is notified by acknowledgment of the request, the acknowledgment including identification of the assigned socket to communicate with the requested access agent. The dynamically assigned socket is selected by system services from sockets available on the host computer on which the server is running. The access agent is adapted to access a requested service.

In another aspect of the invention which provides a communication system and programming for accessing system services on a data communication network of computing devices the server running on a host computer is adapted to listen at a well known port for requests for connection to transient service access agents which are started by the server after receiving a request. The requests come from a client application on the same or another computer. When receiving such a request the server generates a child server to handle the request; wherein the child server is adapted to determine how to start the access agent for service as specified in the request; wherein the child server is adapted to start the access agent with a dynamically assigned socket; and, wherein the client is notified by acknowledgment of the request, the acknowledgment including identification of the assigned socket to communicate with the requested access agent; the dynamically assigned socket being selected by system services from sockets available on the host computer on which the server is running; the access agent being adapted to access a requested service.

Advantageously the access agent is adapted to receive information for the requested service from the client, and; is adapted to start a connection to a service that is not running, and; to connect to a service that is already running.

The system network may be a tcp/ip network wherein the child server is adapted to perform a security check on the request before requesting access;

and in which the child server determines how to start the access agent by referring to a local database; and, wherein the access agent is adapted to exchange information for the requested service with the client.

The requested service can include further services and other programs.

The request may preferably comprise:

a host name of the computer that the server being contacted is on;

an application type identifying the class of service requested;

at least one application ID which provides the instance of the service requested.

Another aspect of the invention provides a communication system and software to implement it for interconnecting application processes running on computing devices on a network comprising:

a server daemon adapted to listen for requests for service from access agent on another computer from a client application at a specified port and when receiving such a request generates a child server to handle the request;

the child does security check on the request determines how to start the access agent for service as specified in the request by consulting a local database;

child server starts access agent with a dynamically assigned socket client is notified by acknowledgment of the request which includes identification of the socket to talk to the access agent;

socket that is dynamically assigned from available sockets on the host computer that the server is running on;

the access agent being adapted to do following;

convey information for the requested service, and start other services or other programs.

In addition the invention in its varied embodiments can provide a number of additional advantages over the prior art communications systems:

i) Restricted to Non Privileged Applications

The applications access server of this invention provides a way to restrict the application access agent programs to non-privileged status. The well known ports controlled and assigned by IANA can usually only be used by system (or root) processes, or by programs executed by privileged users.

ii) Separation of Administration Security from Application Security

The applications access server of this invention enforces the general security policies required by the administration of the computer running the applications access server of the invention. A failure to pass the access server's security screen results in denial of access to the applications access agent. As a result, the application access agent of this invention may result in the tightening of the security of an application not the relaxation of security enforcement by the application access server employing this invention.

iii) Utility for Administration of Service offerings by users.

A command accessible to non-privileged users is provided to manage services accessible through the present invention. The syntax of the command that is useful in a preferred embodiment of the invention is as follows:

```
inaas_services [-u user] file
inaas_services [-l | -r]
```

The inaas-service file specifies services to be provided by Internet Application Access Server (INAAS) (a preferred embodiment of the invention herein). The services will be run as the user that invoked inaas services, and the group will be the user's group, with the restriction that privileged users and users that are members of a privileged group cannot invoke the utility. An exception to this restriction is that the super-user can invoke inaas_services with the -u option to manage services associated with the non-privileged user. The -l option lists the INAAS services associated with the user. The -r option removes all INAAS services associated with the user.

The inaas_services file consists of lines of five fields, separated by tabs or spaces. No field, except for the last one, may be omitted. The fields are the same as in the inaas.conf file (discussed subsequently) with the user and group fields omitted. The fields are as follows:

1) application type—Identifier for an application service.
2) application instance—Instance of an application service.
3) protocol—Name of a valid protocol (for example, "tcp") specified in the Internet protocols configuration.
4) access agent program—The full pathname of the application access agent to be invoked by the INAAS server when a client's request matches the application type, the application instance, and the protocol.
5) access agent program arguments—Arguments to the access agent, starting with argv[0], which is the name of the program.

The users allowed to use inaas_service can be further restricted from the group of non-privileged users by the FIRST_USER, LAST_USER, and USER entries in the inaas.conf file.

iv) Multiple Application Instances in One Computer

The application instance supplied by the client to the application access server in the access request is used to discriminate between multiple instances of an application in one computer.

v) One Internet Address for Multiple Applications

Only one "well known" port is required to support multiple applications. The access agent of this invention obtains a dynamically assigned port for the client requesting access to the application.

BRIEF DESCRIPTION OF THE DRAWINGS

The invention herein is described in conjunction with the drawings of which.

DESCRIPTION OF THE PREFERRED
EMBODIMENT OF THE INVENTION

Figure 1:
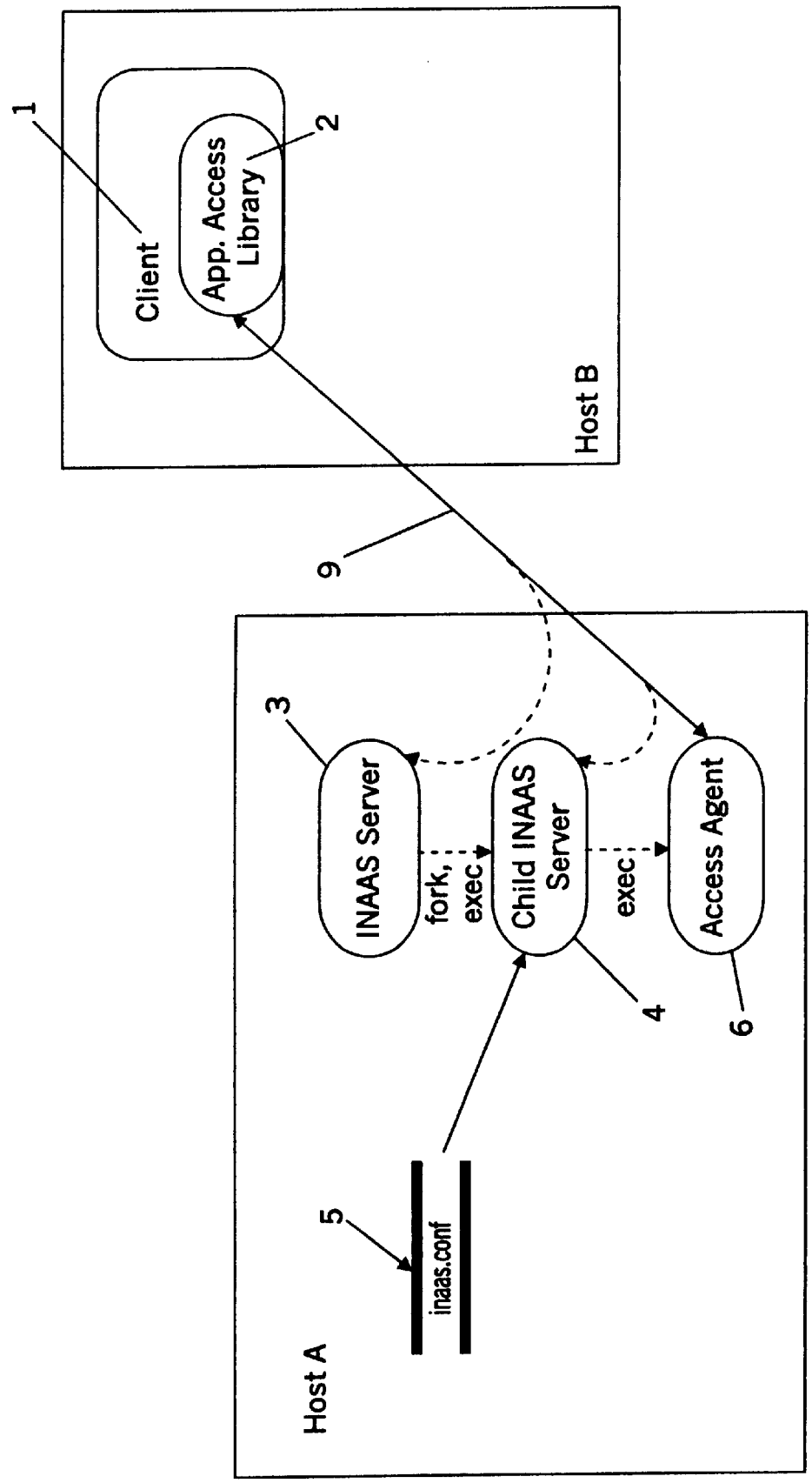
FIG. 1 is a diagram of a computer communications system between two computers employing the present invention.

A brief outline of the method of operation of the invention will be given with reference to FIG. 1 of the drawings. A client 1, which links in the application access library 2, makes a socket connection to the INAAS server 3, (which is usually on a different host but need not be), which forks a child INAAS server 4 to handle each request. The client 1, next writes information down this socket to identify the application to which it requires access. The child 4 compares this request with those applications configured in inaas.conf 5 (see section "inaas.conf" below) and, if a match is found, exec's the appropriate access agent (The exec system call transforms the calling process into a new process. The new process can be constructed from an ordinary executable file, with a header, text segment, and data segment, or from a script file.). At this point a socket connection 9 exists between the client 1 and the access agent 6 for the requested application (which has replaced the child INAAS server). Application specific information is then exchanged over this socket between the client and the access agent.

Figure 2:
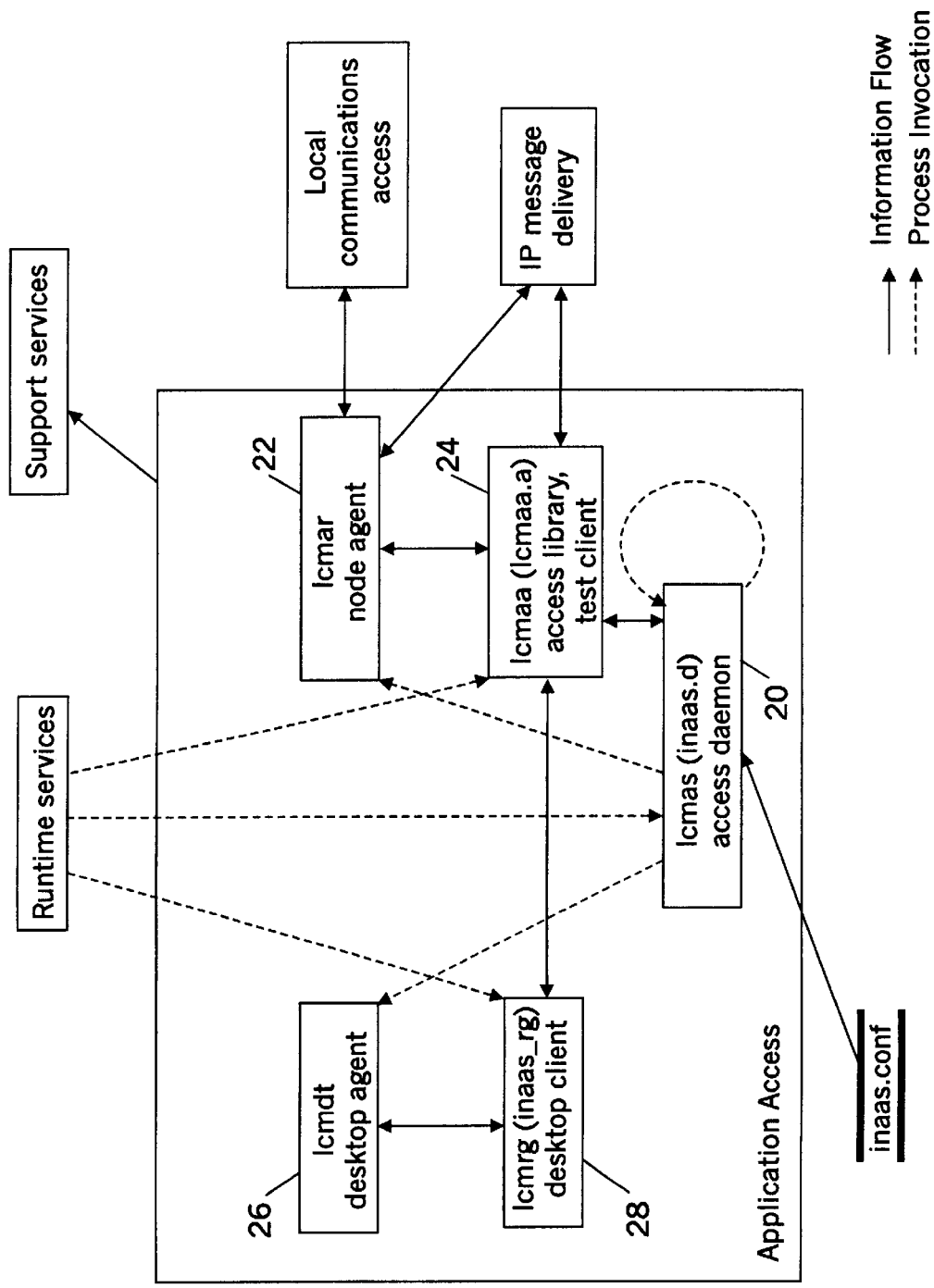
FIG. 2 is a block diagram of the present invention.

The invention, and this particular embodiment provides an application access library (see section "Interfaces Provided" below), an INAAS server daemon program (hereinafter called the INAAS server), and several paired special purpose access agent and client programs (hereinafter called access agents and clients). The Internet application access (INAAS) server provides services similar to portmap on a Unix system. That is, given an identifier for a given application (in this case a hostname, application type, and application, instance which are all strings), the INAAS server provides a socket connection 9 to the designated access agent, (e.g.. lcmar 22 or lcmdt 26) as shown in FIG. 2. Information is usually exchanged over this socket between a client 1 and the access agent 6 to access an/or startup "Internet" applications.

Interfaces Provided

The application access library 2 provides a simple API with a single function call:

```
int      inaas_request_application(
char     *       ira_hostname,
char     *       ira_ip_protocol1,
char     *       ira_app_identifier,
char     *       ira_app_instance1,
int              ira_timeout);
```

This function returns the file descriptor of the socket connected to the access agent for the requested application.

Architectural Overview of the Application of a Particular Embodiment of the Present Invention The primary use of the preferred embodiment of INAAS is in the control network for an IBM Video Conferencing System. The control network is based on an IBM Internet communications architecture. In this architecture a virtual network of addressable control "nodes" is built on top of an Internet network or networks. A node in this architecture is a collection of application processes that share a node ID, and the individual application processes within a node are assigned port numbers that are unique within the node. Messages can be sent between application processes on different nodes using the <node id, port number> tuple as the application process address.

Figure 5:
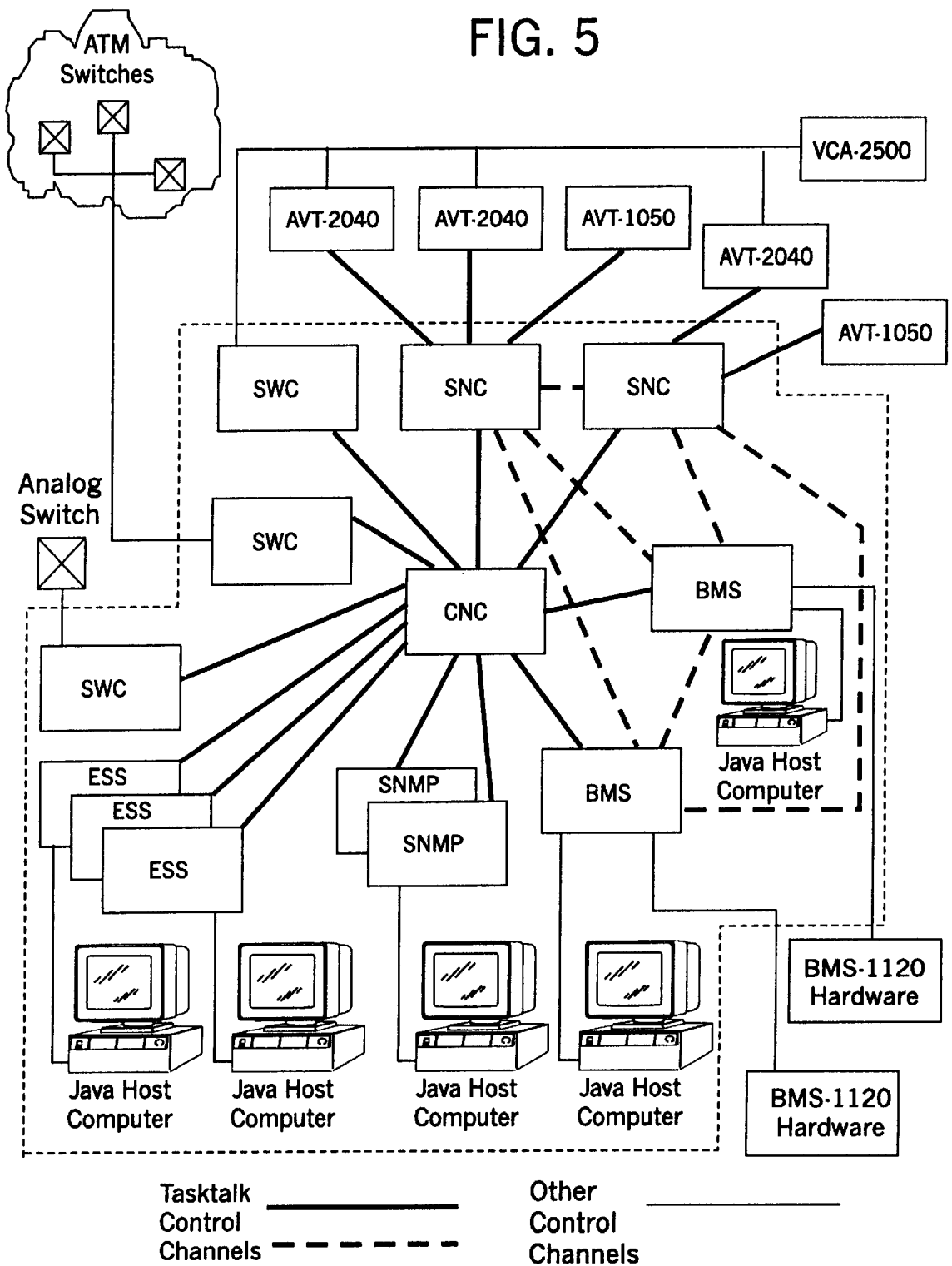
FIG. 5 illustrates a network of communication devices and computers.

FIG. 5 shows an example of a network constructed in accordance with this Internet communications architecture. The boxes label led CNC, SNC, SWC, BMS, ESS, SNMP, and AVT are nodes of the network. Note that multiple nodes can be put on a single Internet host, and each node is assigned its own user account for all its application processes to run in. The role of INAAS in this Internet network is to establish connections between the nodes of the network. In this case, the control nodes are the services being accessed by INAAS, and the clients requiring access are the other nodes in the network. In this capacity, INAAS may establish a connection between two nodes that are up and running, or it may start a node at the request of another node. In fact, an entire network that is down (all nodes down) can be started by starting any single node, and all nodes will be started as each node tries to connect to its neighbors via INAAS.

To serve this function in the Internet network, a client, access agent pair of programs have been developed called lcmlc (also called the "hunter", as it can hunt for other nodes) and lcmar, respectively. A second client, access agent pair called inaas_rg and lcmdt are also used in the Internet network, but their function will not be discussed more than required for the purposes of understanding this invention. An architectural explanation of INAAS with respect to lcmlc and lcmar is provided below. Examples of starting a service at the request of a client is provided in the section "Start Up of a Service—Wave Node", and an example of connecting to a running service is provided in the section "Connecting to a Running Service—Two nodes establishing communications over IP".

The present invention can be viewed as 5 modules: lcmas(inaas) 20, lcmar 22, lcmaa 24, lcmdt 26 and lcmrg 28 as illustrated in FIG. 2 which gives an overview of information flows and process invocation events between the modules and external components and subsystems.

The general operation of the invention is as follows:

An access client (lcmrg, inaas_test from lcmaa, IP Message Deliver) calls lcmaa (inaas_request_application in the application access library lcmaa.a) which makes a socket connection to the INAAS server. At this point the INAAS server forks a child which exec's lcmas_vr (part of lcmas), thereby becoming the child INAAS server, which handles the upcoming request. Information is exchanged between the client and lcmas_vr (child of the INAAS server) through lcmaa (on the client side). If a valid request is submitted, lcmas_vr execs the appropriate access agent (lcmar or lcmdt), and inaas_request_application returns with the file descriptor of the socket which still maintains the connection. At this point the client task is directly connected via the socket to the access agent, and further application specific information is exchanged over this socket.

The access agent lcmar uses Local Communications Access to request the list of UDP port numbers from IP Message Delivery which it searches to find the appropriate one to return to its client over the socket.

Modules
lcmar
Important Routines
main (lcmar/lcmar.c). This is the main line of lcmar, which does the following:
1. checks that the socket to which it is connected in on the local lan if required.
2. reads request over socket from client and compares it with expected value.
3. gets a semaphore to prevent simultaneous lcmar's trying to start the same node.
4. checks whether the node is already up.
5. if node is up, skip to step 8
6. invoke the startup script specified on the command line
7. check whether node is up, die and release semaphore if fails
8. release semaphore protection.
9. invoke query_ip_addrs to get all the UDP ports from lcmlc.
10. find if one of these matches the network part of the client's socket address.
11. return the matching UDP port in OK message or log a FAIL message over the socket.

lcmaa
Important Routines
inaas_request_application (lcmaa/aa_client.c) . This routine is part of the interface to Application Access (the invention). Client tasks invoke this routine to gain access to remote (usually) application agents. This routine sets up a connection to the remote inaas.d daemon and exchanges information to identify the requested application. If the request is successful, it returns the socket that is now connected to the access agent.

lcmas
Important Routines
main(lcmas/lcmas.c). This routine is the mainline for the INAAS server, inaas.d. It opens and binds a socket to the inaas port from /etc/services. It then listens on this port and forks lcmas vr whenever a valid connection is established, and goes back to listening.

lcmas_vr(lcmas/lscmas.perl). This is a perl script in this embodiment that is forked by inaas.d to handle requests. It parses inaas.conf, reads in the request (in two parts) over the socket which is attached to its standard input, stdin, and sends back responses through its standard output, stdout, which is connected to the socket. If the request matches an application configured in inaas.conf, the listed application access agent is exec'ed in place of this script.

PSEUDO CODE OF THE INVENTION

The present invention can be represented by the following pseudo code from which persons skilled in the art can apply the invention:

INAAS Server (inaas.d)
{
    Open and bind a socket to the INAAS port
    while (no failure conditions encountered)
    {
        Accept socket connection from client
        Start child INAAS server with dynamically assigned
        socket connecting the child to the client
    }

```
}
Child INAAS Server (child inaas.d)
{
    Receive client application access agent request
    Find access agent entry corresponding to request in
    inaas.conf
    if (request does not pass INAAS server's security
    restrictions)
    {
        deny access to access agent
    }
    else
    {
        Setup access agent to run as user and group specified
        in inaas.conf
        exec access agent specified in inaas.conf
        return identifier of connection to the access agent to
        the client
    }
}
Client Task
{
    Call inaas_request_application(), identifying the
    application by
        i) hostname of (server computer)
        ii) application type
        iii) application instance
    inaas_request_application() connects to remote INAAS server
    inaas_request_application() sends application type and id
    down the connection
    if (INAAS server OK's the request)
    {
        inaas_request_application() returns socket identifier
        for connection to the access agent
        Sends request to the access agent
        Application specific information is exchanged between
        the client and
        access agent
    }
}
Access Agent
{
    Invoked with connection to the client already established
    reads request from the client
    if (valid request for this agent)
        Application specific information is exchanged between
        the client and access agent
    }
}
```

Figure 4A:
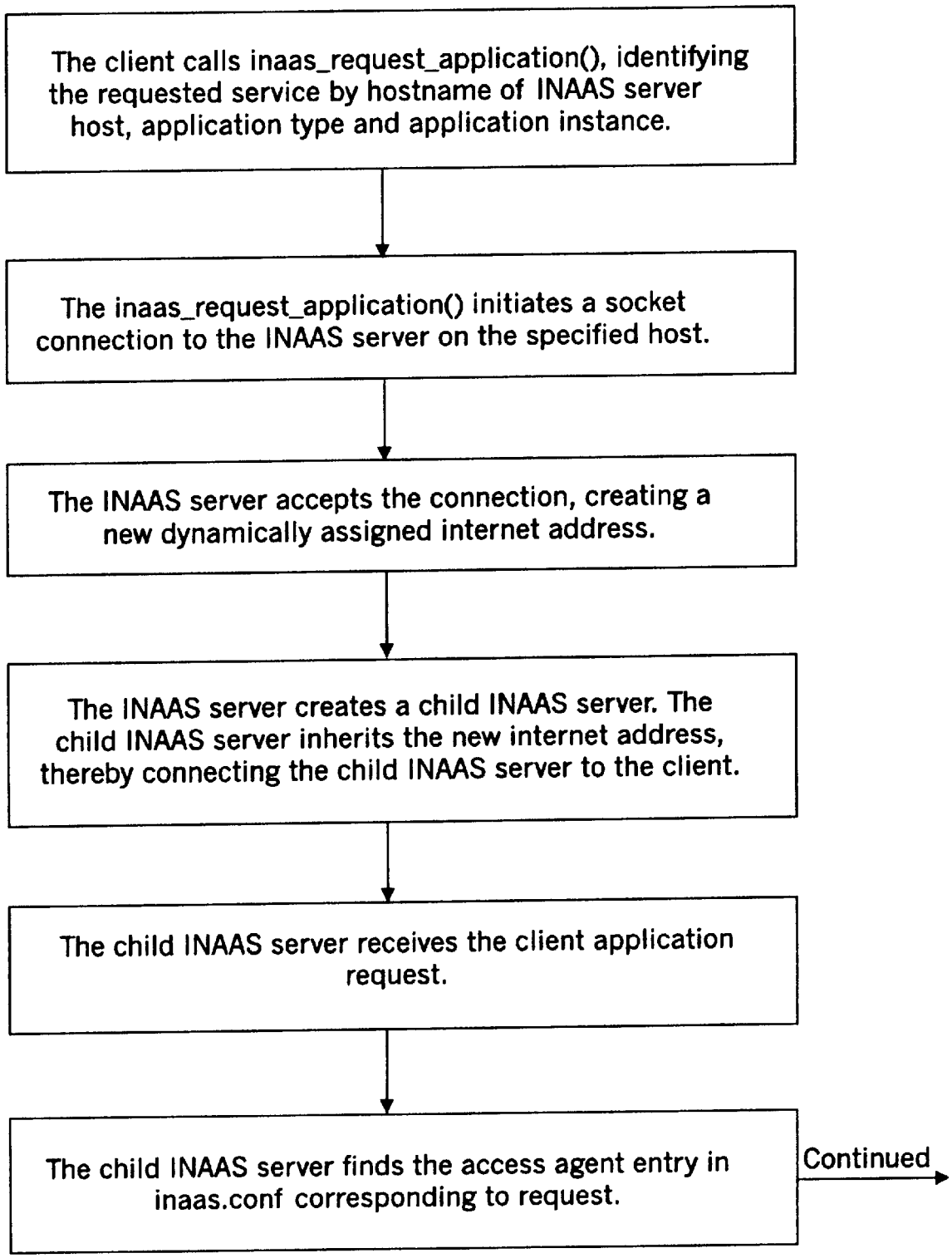
FIG. 4 is a flow chart of the operation of the present invention.
Figure 4B:
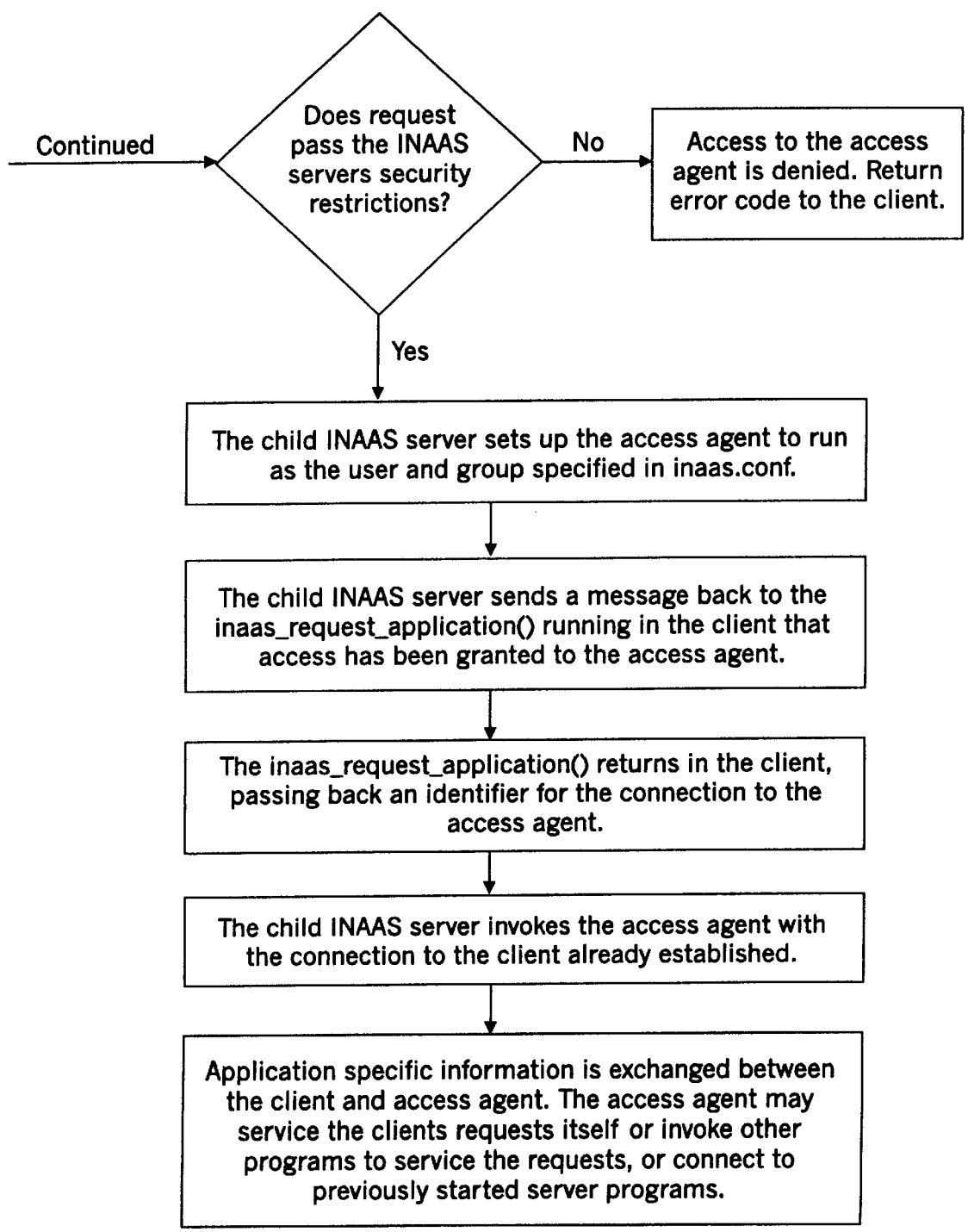

Referring to FIG. 4, a flow chart of the method of the invention, when a service is requested the application access client calls the inaas_request_application(), identifying the requested service by the host name of the INAAS server host, the application type and the application instance. The inaas_request_application() then initiates a socket connection to the INAAS server on the specified host. The INAAS server accepts the connection, creating a new dynamically assigned Internet address. The INAAS server creates a child INAAS server. The child INAAS server inherits the new Internet address, thereby connecting the child INAAS server to the application access client. The child INAAS server receives the client application request. The child INAAS server finds the application access agent entry in inaas.conf, the INAAS configuration file corresponding to the request.

If the request passes the INAAS server's security restriction the child INAAS server sets up the access agent to run as the user and group specified in inaas.conf. The child server sends a message back to the inaas_request application() running in the client application that access has been granted to the access agent.

The inaas_request_application( ), returns in the client, passing back an identifier for the connection to the access agent.

The child INAAS server then invokes the access agent with the connection to the client already established.

The client and access agent now have a two-way communication path between them.

Application specific information can now be exchanged between the client and access agent. The access agent may service the client's requests itself or invoke other programs to service the requests.

The subjects of starting an application and accessing a running application are covered in the sections "startup of a Service" and "Connecting to a Service".

inaas.conf inaas.conf is the configuration file for the INAAS server. The file consists of two series of single-line entries.

The first series of entries consist of optional <NAME>= <value> specifications that can restrict the acceptable values of protocols, users and groups in the following application configuration lines.

The valid names are:

1) FIRST_PROTOCOL
2) LAST_PROTOCOL
3) PROTOCOL

Valid<value>s are symbolic protocol identifiers or numeric protocol values from the Internet protocol definitions.

Only one protocol range shall be supported. The order and members of a protocol range are determined by the numeric values of the Internet protocol definitions.

PROTOCOL=<value>entries can occur multiple times, and the <value>s are NOT limited by FIRST_PROTOCOL and LAST_PROTOCOL entries.

4) FIRST_USER
5) LAST_USER
6) USER

Valid <value>s are literal user names or numeric user identifiers from the computer's user identification system.

Only one user range shall be supported. The order and members of a user range are determined by the numeric user ids of computers user identification system.

USER=<value>entries can occur multiple times, and the <value>s are NOT limited by FIRST_USER and LAST_USER entries.

7) FIRST GROUP
8) LAST_GROUP
9) GROUP

Valid<value>s are literal user names or numeric user identifiers from the computer's group identification system.

Only one group user range shall be supported. The order and members of a group range are determined by the numeric group ids of the computer's group identification system.

USER=<value>entries can occur multiple times, and the <value>s are NOT limited by FIRST_USER and LAST_USER entries.

In the second series, each entry corresponding to an application service to be invoked by inassd. These services are based on one of the Internet protocols.

Each application entry has a series of space or tab separated fields. (No field, except for the last one, may be omitted.) the fields are as follows:

1) application type—Identifier for an application service.
2) application instance_Instance of an application service.
3) protocol—Name of the user under which the access agent should run. This user must be an unprivileged user of the computer.

5) group—Name of the group under which the access agent should run. This group must be a non-privileged group of the system, and the user must be a valid member of the group.

6) access agent program—The full pathname of the application access agent to be invoked by the INAAS server when a client's request matches the application type, the application instance, and the protocol. The application agent is invoked with a socket connection back to the client as file descriptors 0, 1, and 2.

7) access agent program arguments—Arguments to the access agent, starting with argv[0], which is the name of the program.

Multiple Instances

If there are two or more entries in inaas.conf for the same application (distinguished by application id) you have multiple instances of the application.

Startup of a Service (e.g.. an Internet communications node)

Figure 6A:
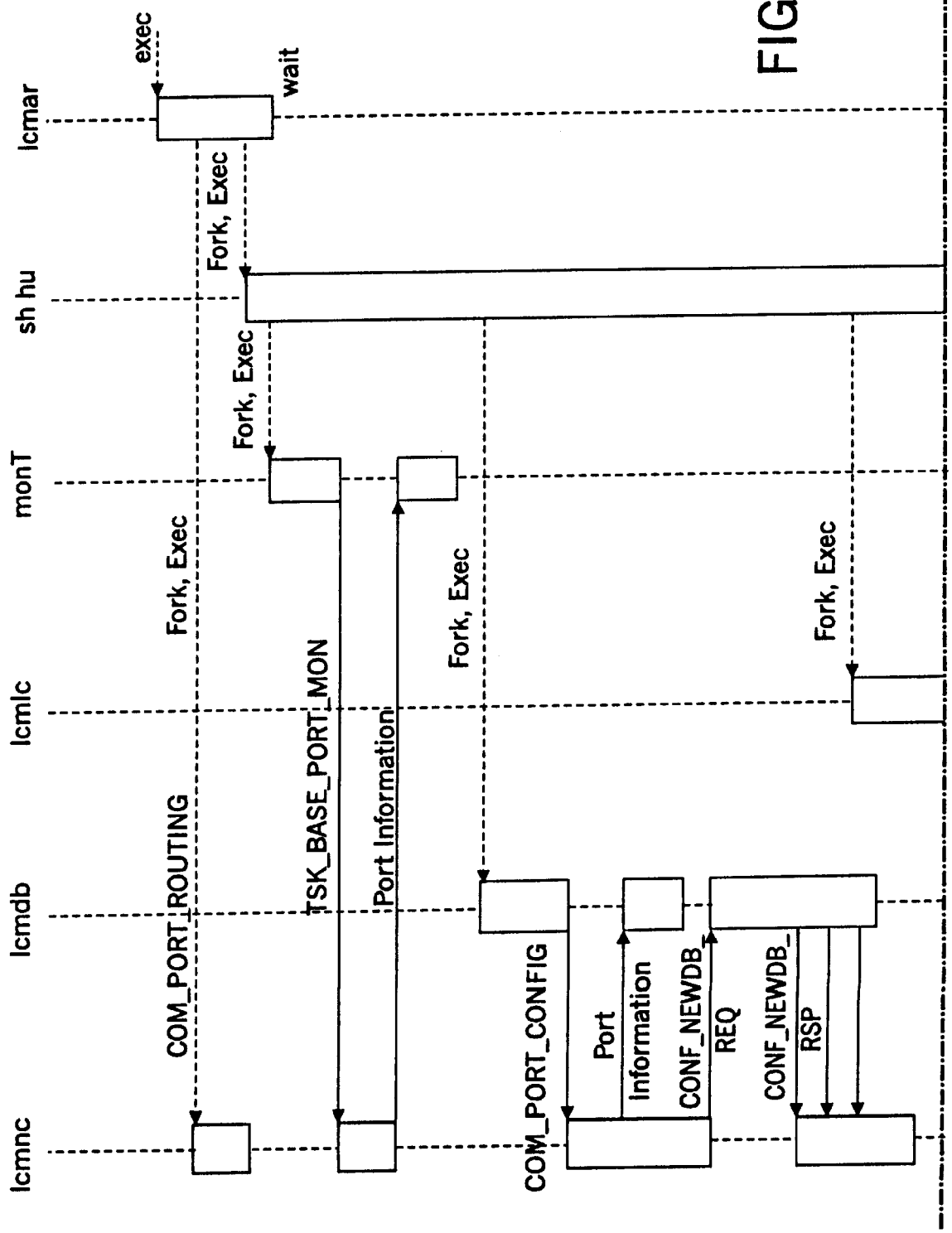
FIG. 6 is a timing diagram of the sequence of events that occur in the startup and connection to a service.

Referring to FIG. 6 and the description below there is disclosed a sequence of messages sent between the communications tasks during node startup. Note that all messages in this embodiment actually pass through lcmnc en route to their destination.

lcmar is exec'ed by inaas.d to find a node's UDP port address (and start it up if necessary). In this case the node is not up yet so lcmar must start it.

Startup lcmar receives the request from the client lcmar sends a message to the echo port on the Internet communications node. The echo does not return, so the node is apparently down lcmar uses the system command to start up the shell script hu.

hu uses an internal node specific database to determine all application processes to start for the node, and the order of startup hu starts at the application processes hu exits, triggering lcmar to continue processing.

Startup ends lcmar verifies that a message sent to the application echo port on the started application system returns to it.

lcmar sends a request to lcmlc for all the active UDP port numbers.

lcmlc sends the list to lcmar, which decides which is the appropriate port number to write down a socket to the application access client. It uses the parameters of the socket to decide which port is appropriate.

lcmar writes the udp port number down the connection to the client.

Accessing an Running Application

Connecting to a Running Service (an Internet communications node)

Figure 3:
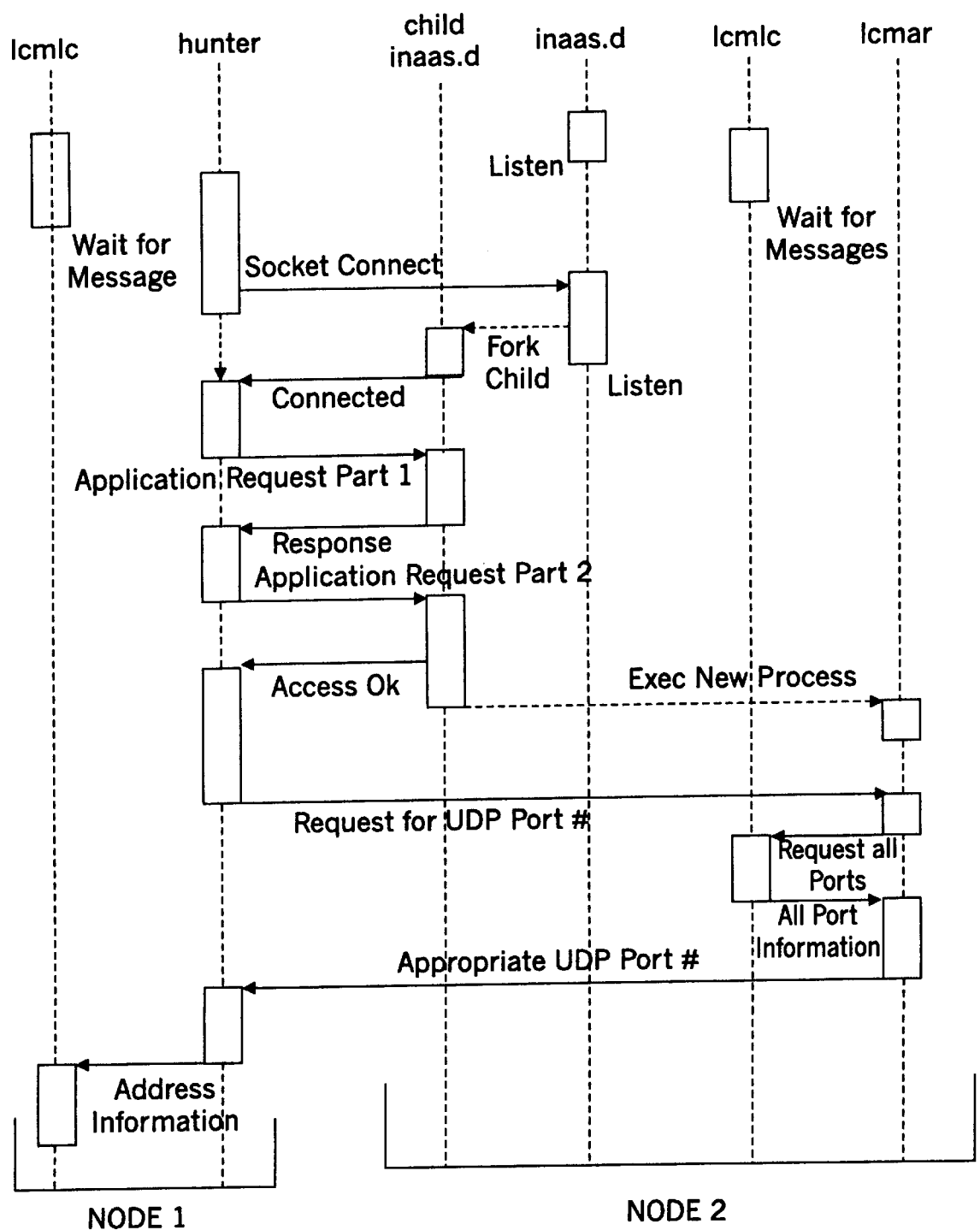
FIG. 3 is a timing diagram of the sequence of events that occur when an application is accessed using the present invention.

FIG. 3 which shows a typical sequence of events that occur when an application is accessed using the invention herein. For the purpose of this illustration, the client is referred to as the lcmlc address hunter for which the appropriate access agent is lcmar, to be run on the node for which the UDP address is needed.

The two tasks (lcmlc and hunter) at the left of the diagram are running on a different node, node 1 (and often a different host) than the two (lcmlc and lcmar) tasks shown at the right, node 2. Inaas.d and child inaas.d are tasks running as root on the same host as the node on the right.

In FIG. 3 the socket connections are shown in dark solid lines, UNIX System V messages are shown in light solid lines, and the forking or exec'ing of new processes is shown in dashed lines.

The objective of the operation depicted is to get the lcmlc's of the two nodes to talk to each other.

Still referring to FIG. 3 the process of obtaining a connection is described below:

The hunter of node 1 (acting as a client) initiates a socket connection to the INAAS server on the host on which the application resides, node 2.

The INAAS server of node 2 accepts this connection and forks a child to handle the upcoming request.

Information identifying the request is exchanged over the socket between the hunter and the child of INAAS server.

Child INAAS server validates the request by comparing it with data in inaas.conf, and exec's the appropriate access agent task in this case lcmar running as the node's user).

The hunter writes a request for UDP port information down the socket which is now connected to lcmar.

Lcmar checks that the node is up (see the event sequence Start above if it is not), then sends a request for this information to lcmlc.

Lcmlc sends the list of all active UDP ports (one for each network interface) back to lcmar.

Lcmar uses parameters of its socket connection to the hunter to decide which UDP port's information should be written down the socket to the hunter.

The hunter forwards the newly acquired address information to it's parent lcmlc which will make it possible for it to talk to the remote node's lcmlc.

The embodiments of the invention in which an exclusive property or privilege is claimed are defined as follows:

1. A communication system for accessing system services on a network of information handling devices comprising:

server means running on a host computer adapted to listen at a predefined port for requests for connection to service access agents;

where the requests come from a client application;

wherein the server is adapted to determine how to start the access agent for service as specified in said request;

wherein said server is adapted to start said access agent with a dynamically assigned socket; and, wherein said client is notified by acknowledgment of said request, said acknowledgment including identification of said assigned socket to communicate with said requested access agent;

said dynamically assigned socket being selected by system services from sockets available on said host computer on which said server is running;

said access agent being adapted to access a requested service that is already running.

2. The system of claim 1 wherein said network is a tcp/ip network wherein said child server is adapted to perform a security check on said request before requesting access;

and in which said child server determines how to start said access agent by referring to a local database; and, wherein said access agent is adapted to exchange information for the requested service with said client.

3. The system of claim 2 wherein said requested service can include further services and other programs.

4. The system of claim 2 wherein said request comprises:

a host name of the computer that the server being contacted is on;

an application type identifying the class of service requested;

at least one application ID which provides the instance of the service requested.

5. A communication system for accessing system services on a data communication network of computing devices comprising:

server means running on a host computer adapted to listen at a well known port for requests for connection to transient service access agents which are started by said server after receiving a request;

where said requests come from a client application on the same or another computer;

and when receiving such a request generates a child server to handle said request;

wherein said child server is adapted to determine how to start said access agent for service as specified in said request;

wherein said child server is adapted to start said access agent with a dynamically assigned socket; and, wherein said client is notified by acknowledgment of said request, said acknowledgment including identification of said assigned socket to communicate with said requested access agent;

said dynamically assigned socket being selected by system services from sockets available on said host computer on which said server is running;

said access agent being adapted to access a requested service wherein said access agent is adapted to receive information for the requested service from said client; and, is adapted to start a connection to a service that is not running, and;

to connect to a service that is already running.

6. A computer program product comprising:

a computer usable medium having computer readable program code means embodied therein for operating a communication system for accessing system services on a network of information handling devices comprising:

program code for causing:

server means running on a host computer to listen at a predefined port for requests from a client application for connection to service access agents;

wherein said server is adapted to determine how to start said access agent for service as specified in said request;

wherein said server is adapted to start said access agent with a dynamically assigned socket; and, including code means wherein said client is notified by acknowledgment of said request, said acknowledgment including identification of said assigned socket to communicate with said requested access agent;

said dynamically assigned socket being selected by system services from sockets available on said host computer on which said server is running;

said access agent being adapted to access a requested service whether said service is running or not running.

7. A computer program product comprising:

a computer usable medium having program code means embodied therein for causing the establishment of a communication system for accessing system services on a data communication network of computing devices comprising:

program code means in said computer program product to effect:

server means running on a host computer to listen at a well known port for requests for connection to transient service access agents which are started by said server after receiving a request;

where said requests come from a client application on the same or another computer;

and when receiving such a request generates a child server to handle said request;

wherein said child server is adapted to determine how to start said access agent for service as specified in said request;

wherein said child server is adapted to start said access agent with a dynamically assigned socket; and, wherein said client is notified by acknowledgment of said request, said acknowledgment including identification of said assigned socket to communicate with said requested access agent;

said dynamically assigned socket being selected by system services from sockets available on said host computer on which said server is running;

said access agent being adapted to access a requested service wherein said access agent is adapted to receive information for the requested service from said client; and, is adapted to start a connection to a service that is not running; and, to connect to a service that is already running.

8. The system of claim 7 wherein said network is a tcp/ip network wherein said child server is adapted to perform a security check on said request before requesting access;

and in which said child server determines how to start said access agent by referring to a local database; and, wherein said access agent is adapted to exchange information for the requested service with said client.

9. The system of claim 8 wherein said requested service can include further services and other programs.

10. The system of claim 8 wherein said request comprises:

a host name of the computer that the server being contacted is on;

an application type identifying the class of service requested;

at least one application ID which provides the instance of the service requested.

11. A method for operating a communication system for accessing system services on a network of information handling devices comprising:

providing a server running on a host computer adapted to listen at a predefined port for requests for connection to service access agents;

where said requests come from a client application;

wherein said server is adapted to determine how to start said access agent for service as specified in said request;

wherein said server is adapted to start said access agent with a dynamically assigned socket; and, acknowledging said request to said client, said acknowledgment including identification of said assigned socket to communicate with said requested access agent;

said dynamically assigned socket being selected by system services from sockets available on said host computer to which said server is running;

said access agent being adapted to connect to a requested service that is already running.

12. A method of operating a communication system for accessing system services on a data communication network of computing devices comprising:

providing a server running on a host computer and adapted to listen at a well known port for requests for connection to transient service access agents which are started by said server after receiving a request;

where said requests come from a client application on the same or another computer; and, when receiving such a request generates a child server to handle said request;

wherein said child server is adapted to determine how to start said access agent for service as specified in said request;

wherein said child server is adapted to start said access agent with a dynamically assigned socket; and, acknowledging said request to said client, said acknowledgment including identification of said assigned socket to communicate with said requested access agent;

said dynamically assigned socket being selected by system services from sockets available on said host computer on which said server is running;

said access agent being adapted to connect to a requested service that is already running and to start a connection to a service that is not running.

13. A method of operating a communication system for accessing system services on a data communication network of computing devices comprising:

providing a server running on a host computer and adapted to listen at a well known port for requests from a client application for connection to transient service access agents which are started by said server after receiving a request;

generating a child server to handle such a request, which child server is adapted to determine how to start said access agent for service as specified in said request;

starting said access agent with the child server and providing a dynamically assigned socket for the client to communicate directly with the access agent; and, acknowledging said request to said client, said acknowledgment including identification of said assigned socket to communicate with said requested access agent adapted to access a requested service, said dynamically assigned socket being selected by system services from sockets available on said host computer on which said server is running.

14. The method of claim 13 wherein said child server performs a security check on said request before requesting access;

and in which said child server determines how to start said access agent by referring to a local database; and, wherein said access agent is adapted to exchange information for the requested service with said client.

15. The method of claim 14 wherein said access agent is adapted to receive information for the requested service from said client, and, is adapted to start a connection to a service that is not running; and, to connect to a service that is already running.

16. The method of claim 15 wherein said requested service can include further services and other programs.

17. The method of claim 15 wherein said request comprises:

a host name of the computer that the server being contacted is on;

an application type identifying the class of service requested;

at least one application ID which provides the instance of the service requested.

* * * * *